US007752606B2

(12) United States Patent
Savage

(10) Patent No.: US 7,752,606 B2
(45) Date of Patent: Jul. 6, 2010

(54) SOFTWARE DEVELOPMENT TOOL USING A STRUCTURED FORMAT TO GENERATE SOFTWARE CODE

(75) Inventor: Andrew Francis Savage, Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 1338 days.

(21) Appl. No.: 11/200,177

(22) Filed: Aug. 10, 2005

(65) Prior Publication Data

US 2007/0038977 A1   Feb. 15, 2007

(51) Int. Cl.
*G06F 9/44* (2006.01)

(52) U.S. Cl. .................. 717/135; 717/100; 717/102; 717/105; 717/107; 717/120; 717/123; 717/124; 717/125; 717/132

(58) Field of Classification Search .................. 717/100
See application file for complete search history.

(56) References Cited

U.S. PATENT DOCUMENTS

| | | | | |
|---|---|---|---|---|
| 5,671,415 A | * | 9/1997 | Hossain | 717/101 |
| 5,987,247 A | * | 11/1999 | Lau | 717/100 |
| 6,028,997 A | * | 2/2000 | Leymann et al. | 717/104 |
| 6,212,672 B1 | * | 4/2001 | Keller et al. | 717/104 |
| 6,257,774 B1 | | 7/2001 | Stack | |
| 6,490,719 B1 | * | 12/2002 | Thomas | 717/107 |
| 6,505,342 B1 | * | 1/2003 | Hartmann et al. | 717/104 |
| 6,658,656 B1 | * | 12/2003 | Thompson | 717/151 |
| 6,678,875 B2 | * | 1/2004 | Pajak et al. | 716/11 |
| 6,681,383 B1 | | 1/2004 | Pastor et al. | |
| 6,701,513 B1 | | 3/2004 | Bailey | |
| 7,197,740 B2 | * | 3/2007 | Beringer et al. | 717/108 |
| 7,322,024 B2 | * | 1/2008 | Carlson et al. | 717/120 |
| 2002/0046394 A1 | | 4/2002 | Do et al. | |
| 2002/0099530 A1 | * | 7/2002 | Foltinek | 703/22 |
| 2002/0100014 A1 | * | 7/2002 | Iborra et al. | 717/104 |
| 2002/0133812 A1 | | 9/2002 | Little et al. | |
| 2002/0199034 A1 | | 12/2002 | Beckett et al. | |
| 2002/0199168 A1 | | 12/2002 | Namito | |
| 2003/0134677 A1 | | 7/2003 | Obied et al. | |
| 2003/0140332 A1 | | 7/2003 | Norton et al. | |
| 2003/0221184 A1 | | 11/2003 | Gunjal et al. | |
| 2004/0015832 A1 | | 1/2004 | Stapp et al. | |
| 2005/0203865 A1 | * | 9/2005 | Sundararajan et al. | 707/1 |

\* cited by examiner

*Primary Examiner*—Lewis A Bullock, Jr.
*Assistant Examiner*—Paul Mills
(74) *Attorney, Agent, or Firm*—Finnegan, Henderson, Farabow, Garrett & Dunner, L.L.P.

(57) ABSTRACT

Systems and methods are provided for the automated development and implementation of software using parameter-based requirements. Such systems and methods may include acquiring terms usable to create a parameter-based requirement, in which each of the terms contains at least one attribute, and storing a glossary containing the terms. The systems and methods may further include collecting a system requirement from a user based on the terms stored in the glossary, generating the parameter-based requirement based on the terms stored in the glossary and the system requirement, and creating an artifact based on the parameter-based requirement.

35 Claims, 10 Drawing Sheets

| | TERM | DATA SOURCE | GLB POSITION START | GLB POSITION LENGTH | INTERFACE DATA TYPE | GLOBAL DATA TYPE | FORMAT | |
|---|---|---|---|---|---|---|---|---|
| 1 | 1015626 Unisys 16-Digit Account Number at charge-off | 1030785 CRS Dual Strategy Account - IB | 1 | 16 | 0 TBD | a)TEXT | | 1 |
| 3 | 1057897 RECAP Roster Account Number | 1030785 CRS Dual Strategy Account - IB | 2 | 9 | 0 TBD | a)NUMBER | | 0 |
| 4 | 1009334 Charge Off Date | 1030785 CRS Dual Strategy Account - IB | 3 | 8 | 0 TBD | a)DATE | YYYYMMDD | 0 |
| 5 | 1014970 Last Payment Date | 1030785 CRS Dual Strategy Account - IB | 4 | 8 | 0 TBD | a)DATE | YYYYMMDD | 0 |
| 6 | 1015529 Original Account Opening Date | 1030785 CRS Dual Strategy Account - IB | 5 | 1 | 0 TBD | a)DATE | YYYYMMDD | 0 |
| 7 | 1015531 Charge Off Principal Amount | 1030785 CRS Dual Strategy Account - IB | 6 | 9 | 0 TBD | a)NUMBER | | 0 |
| 8 | 1015681 Last Payment Amount | 1030785 CRS Dual Strategy Account - IB | 7 | 9 | 0 TBD | a)NUMBER | | 0 |
| 9 | 1043549 Charge Off Principal Amount | 1030785 CRS Dual Strategy Account - IB | 8 | 9 | 0 TBD | a)NUMBER | | 0 |
| 10 | 1043936 Relevance | 1030785 CRS Dual Strategy Account - IB | 9 | 50 | 0 TBD | a)TEXT | | 0 |
| 11 | 1015690 Account Stature Code - CRS Dual Strategy IB | 1030785 CRS Dual Strategy Account - IB | 10 | 3 | 0 TBD | a)TEXT | | 0 |
| 12 | 1006300 Agency Code | 1030785 CRS Dual Strategy Account - IB | 12 | 6 | 0 TBD | a)TEXT | | 0 |
| 13 | 1015956 Interest Rate | 1030785 CRS Dual Strategy Account - IB | 13 | 5 | 0 TBD | a)NUMBER | | 0 |
| 14 | 1015712 Payment Schedule Code | 1030785 CRS Dual Strategy Account - IB | 14 | 5 | 0 TBD | a)TEXT | | 0 |
| 15 | 1015534 Scheduled Monthly or Minimum Payment Amount | 1030785 CRS Dual Strategy Account - IB | 15 | 8 | 0 TBD | a)NUMBER | | 0 |
| 16 | 1044769 Payment Scheduled Start Date | 1030785 CRS Dual Strategy Account - IB | 16 | 8 | 0 TBD | a)DATE | YYYYMMDD | 0 |
| 17 | 1015609 Master Calendar Date | 1030785 CRS Dual Strategy Account - IB | 17 | 8 | 0 TBD | a)DATE | YYYYMMDD | 0 |
| 18 | 1015700 Master Calendar Code | 1030785 CRS Dual Strategy Account - IB | 18 | 3 | 0 TBD | a)TEXT | | 0 |
| 19 | 1051676 Responsibility Code | 1030785 CRS Dual Strategy Account - IB | 19 | 14 | 0 TBD | a)TEXT | | 0 |

SOFTWARE DEVELOPMENT TOOL USING A STRUCTURED FORMAT TO GENERATE SOFTWARE CODE

BACKGROUND

1. Field of the Invention

The present invention generally relates to the field of software development and to automated development tools and implementation strategies for the same. More particularly, the invention relates to systems and methods for the automated generation of software code and supporting documentation by creating and using leverageable requirements.

2. Description of the Related Art

Large scale software projects are plagued with problems that may be attributed directly to the fractious nature of both methodologies and platforms. These problems affect the projects' quality, development and implementation schedule, and ultimately, cost. Tools that are available to assist the development and implementation of software projects, such as requirements repositories, project planners, version controls, configuration management, defect workflow, and test managers, rarely "talk" to each other and require teams of personnel to configure, program, and maintain. Additionally, these tools can require multiple platforms to function, such as UNIX, mainframe, and/or Windows®, requiring an even larger support team. As the architecture grows, the interactions of the projects' various teams become extremely complex. Numerous project teams may be required, including for defect tracking, requirement traceability, release management, project planning, security access, and tool maintenance.

Accordingly, traditional software development and implementation is costly and time-consuming due to the enormous degree of human involvement in all phases of development and implementation. Typical phases of software development and implementation include: requirements gathering and analysis, system and software design and development, implementation, integration and testing, and operation and maintenance.

Broadly put, requirements gathering and analysis is the process of establishing what services are required and what constraints apply to the system's operation and development. In traditional requirements gathering and analysis, teams of analysts have a general understanding of what criteria need to be fulfilled for the software to be considered a success. These teams document business logic and business rules and simply what the system does with data. The requirements team also document customers' needs of the system including, for example, reports, raw data, uptime, production schedules. Unfortunately, these requirements can be filled with holes, inconsistencies, errors, and contradictions that are difficult to detect by a human being reading through hundreds or even thousands of pages of requirements. In some instances, requirements in large-scale projects span thousands of pages in multiple documents written by multiple teams in multiple formats. Moreover, the requirements typically are textual documents with illustrations, which require interpretation by the reader to subjectively determine functionality, scope, priority, and/or level of effort.

Additionally, differences in style of implementation of deliverables may lead to errors and higher maintenance costs. For example, differences in programming style among developers can sometimes cause interoperability issues, errors, inconsistent performance, and higher integration and maintenance costs. Moreover, since so many of the deliverables are customized for the actual implementation rather than generic, most of the deliverables cannot be leveraged for an alternative implementation, either when the initial system is out of date or its implementation is considered undesirable during implementation phase.

Therefore, there is a need for systems and methods for acquiring terms and attributes associated with the terms usable to gather, format, present, and validate data for creating parameter-based and leverageable requirements. There is also a need for systems and methods to generate parameter-based and leverageable requirements by gathering, formatting, and validating leverageable requirements based on the terms and the acquired attributes. There is a further need for systems and methods for automated generation of software code, design artifacts, test cases, requirements documentation, and supporting documentation by creating and using the generated parameter-based requirements.

SUMMARY OF THE INVENTION

Consistent with the present invention, systems and methods for automated software development and implementation are provided. Systems and methods consistent with the invention may include acquiring terms usable to create a parameter-based requirement, wherein each of the terms contains at least one attribute, and storing a glossary containing the terms. Systems and methods consistent with the invention may further include collecting a system requirement from a user based on the terms stored in the glossary, generating the parameter-based requirement based on the terms stored in the glossary and the system requirement, wherein the parameter-based requirement is machine-executable, and creating an artifact based on the parameter-based requirement.

Consistent with other embodiments, systems and methods for developing and generating parameter-based requirements are provided. Such systems and methods may include acquiring terms usable to create a parameter-based requirement, wherein each of the terms contains at least one attribute, and storing the terms in a glossary. Such systems and methods may further include gathering user input based on the terms stored in the glossary, and generating the parameter-based requirement based on the terms stored in the glossary and the user input, wherein the parameter-based requirement is machine-executable.

It is to be understood that both the foregoing general description and the following detailed description are exemplary and explanatory. only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings provide a further understanding of the invention and are incorporated in and constitute a part of this specification. The drawings illustrate various embodiments of the invention, and, together with the description, serve to explain the principles of the invention. In the drawings:

FIGS. 4B-D illustrate exemplary graphical interfaces for creating, entering, adding, modifying, updating, and augmenting parameter-based requirements;

DETAILED DESCRIPTION

Figure 1:
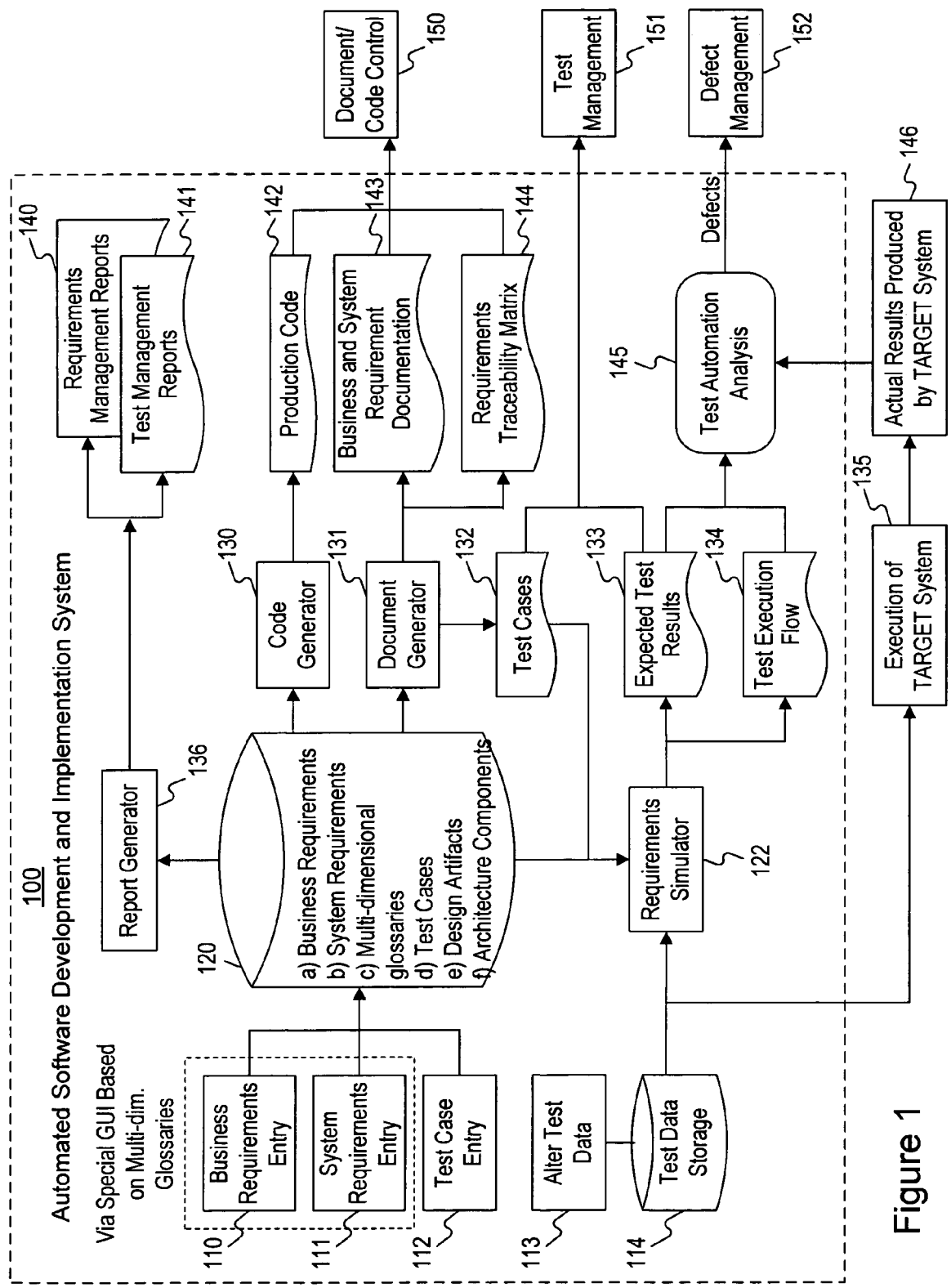
FIG. 1 illustrates an exemplary system for automated software development and implementation.

The following detailed description refers to the accompanying drawings. Wherever possible, the same reference numbers are used in the drawings and the following description when referring to the same or similar parts. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention provide for automated development and implementation of software code, design artifacts, test cases, requirements documentation, and supporting documentation by creating and using leverageable requirements. In order to leverage requirements to reduce manpower required to develop and deliver a software project and to minimize the number and severity of errors encountered during development and delivery, the requirements must be consistent, repeatable, accurate, and be able to work together in a comprehensive and cohesive manner. Systems and methods consistent with the present invention may utilize multidimensional glossaries of terms, in conjunction with user-friendly and flexible graphical user interfaces (GUIs) that restrict and prompt users for required or useful information for the desired software project, to create a repeatable, succinct, and leverageable set of requirements which are parameter-based and machine-executable rather than based on traditional prose.

Consistent with the present invention, an "attribute" or "attributes" contain metadata and attributes of a term used in the requirements. As used herein, the attributes describes and explains the term as used in the requirements and in relation to other terms. In one embodiment, a term's attributes may, for example, contain the term's meaning, usage, hyperlinked references, sources of input data, expected range of input data, expected types of input data, validation rules, valid formats, and/or design artifact. One skilled in the art will appreciate that a term's attribute or attributes may contain more or fewer metadata and attributes than as described in the sample term.

By creating a leverageable set of parameter-based requirements that is machine-executable, systems and methods consistent with the present invention can automatically generate project requirements documentation in any desirable format. The parameter-based requirements may be formatted according to any open or public standards, such as extensible markup language, and is not limited to any specific programs or platforms. Consistent with the present invention, such systems and methods can similarly deliver design artifacts, test cases, and production software code through automatic generation. The production of the aforementioned artifacts and deliverables is automated directly from the requirements. One of the benefits of automated generation of requirements documentation from machine-executable requirements is that the documentation takes on a consistent format. Design and production code are consistent, optimized, and free from "artistic license" and misinterpretation of requirements. Moreover, test cases test actual functionality of a software project as documented in the requirements. Furthermore, systems and methods consistent with the present invention can simulate or model expected results based on the requirements.

FIG. 1 illustrates a block diagram of an exemplary system 100 for automated software development and implementation using a structured format to generate requirements, requirements documentation, supporting documentation, test cases, design artifacts, management reports, and software code, consistent with the present invention. In the example of FIG. 1, the user enters one or more business requirements of a project via a business requirements entry form 110. Business requirements, also known as user requirements, are the high-level goals and objectives of the project.

Figure 4A:
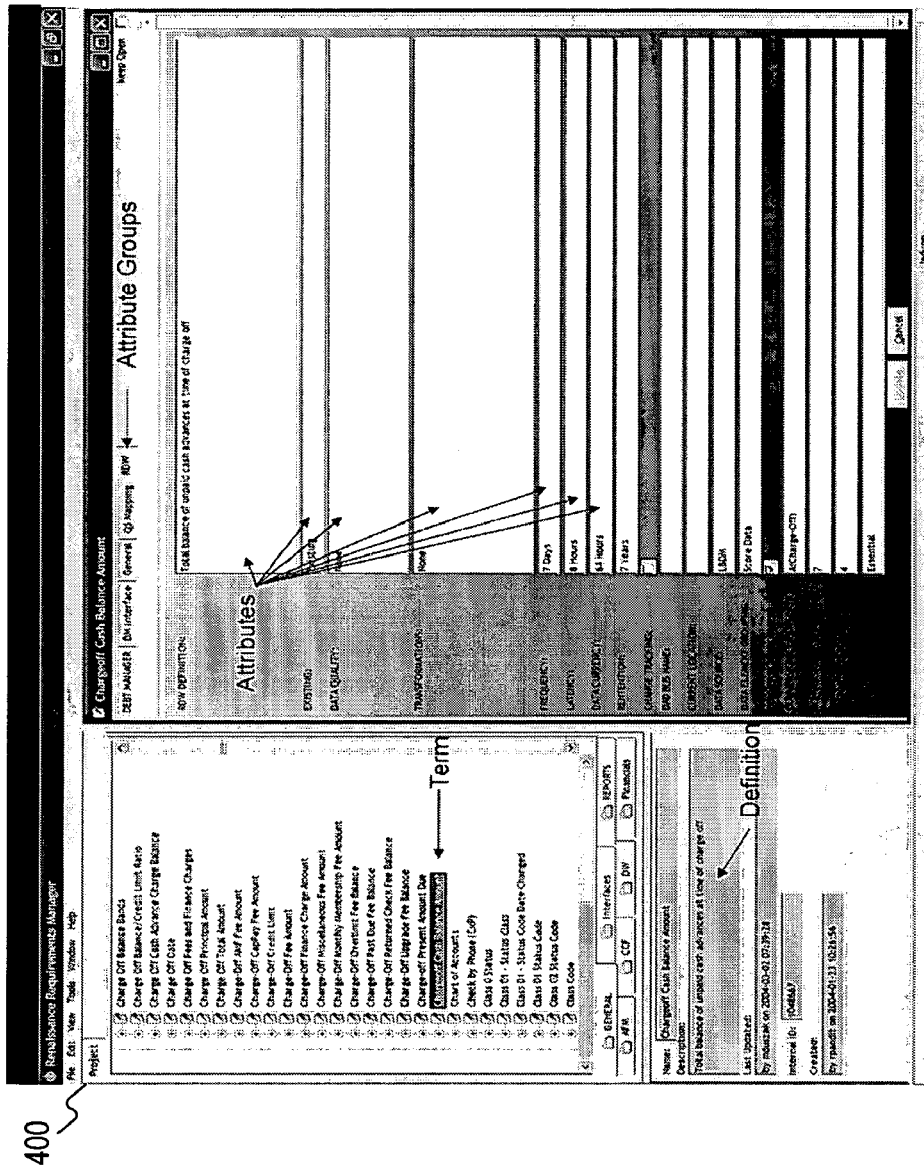
FIG. 4A illustrates an exemplary graphical interface for creating, entering, adding, modifying, updating, and augmenting terms and the terms' definitions and attributes that constitute the requirements.
Figure 4B:
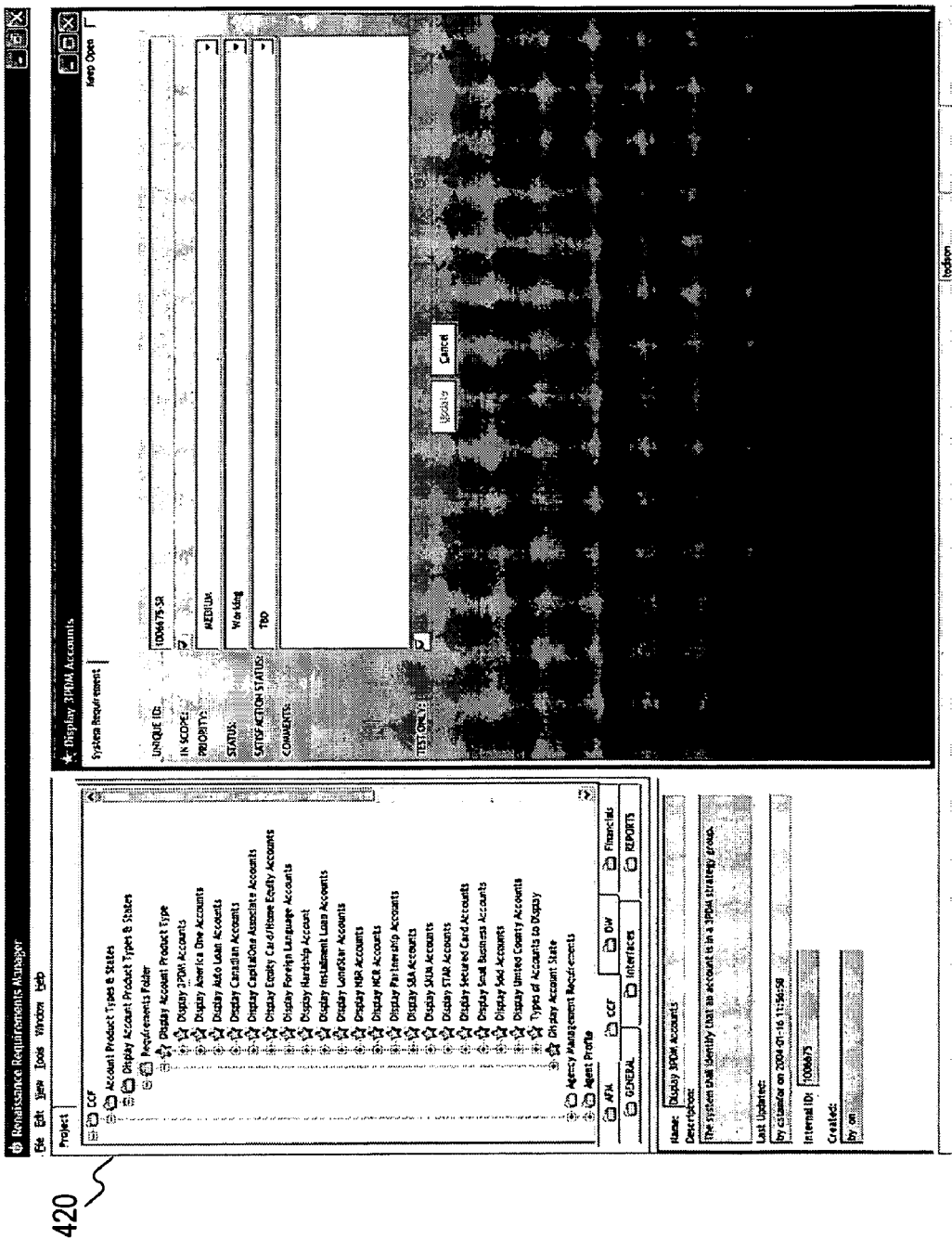

The user also enters one or more system requirements of a project using a system requirements entry form 111. System requirements specify a condition or capability that must be met or possessed by the system or the system's components. System requirements include functional and non-functional requirements, and are developed to directly or indirectly satisfy business requirements. Functional requirements include inputs, outputs, calculations, external interfaces, communications, and special management information needs. In one embodiment, entry forms 110-111 are presented via a GUI (see, e.g., GUI 420 in FIG. 4B). Entry forms 110-111 may be used for entering requirements and may take on a variety of structures depending on the purpose of the requirements. For instance, a simple requirement may require only a fill-in-the-blank form, where the user may enter a description of the requirement and related information, such as the importance, priority, and/or risk of the requirement, the requirement's author, and the requirement's creation, approval, and implementation dates, etc. In FIG. 4B, an GUI 420 provided to illustrate an exemplary fill-in-the-blank form for system requirements.

Figure 4D:
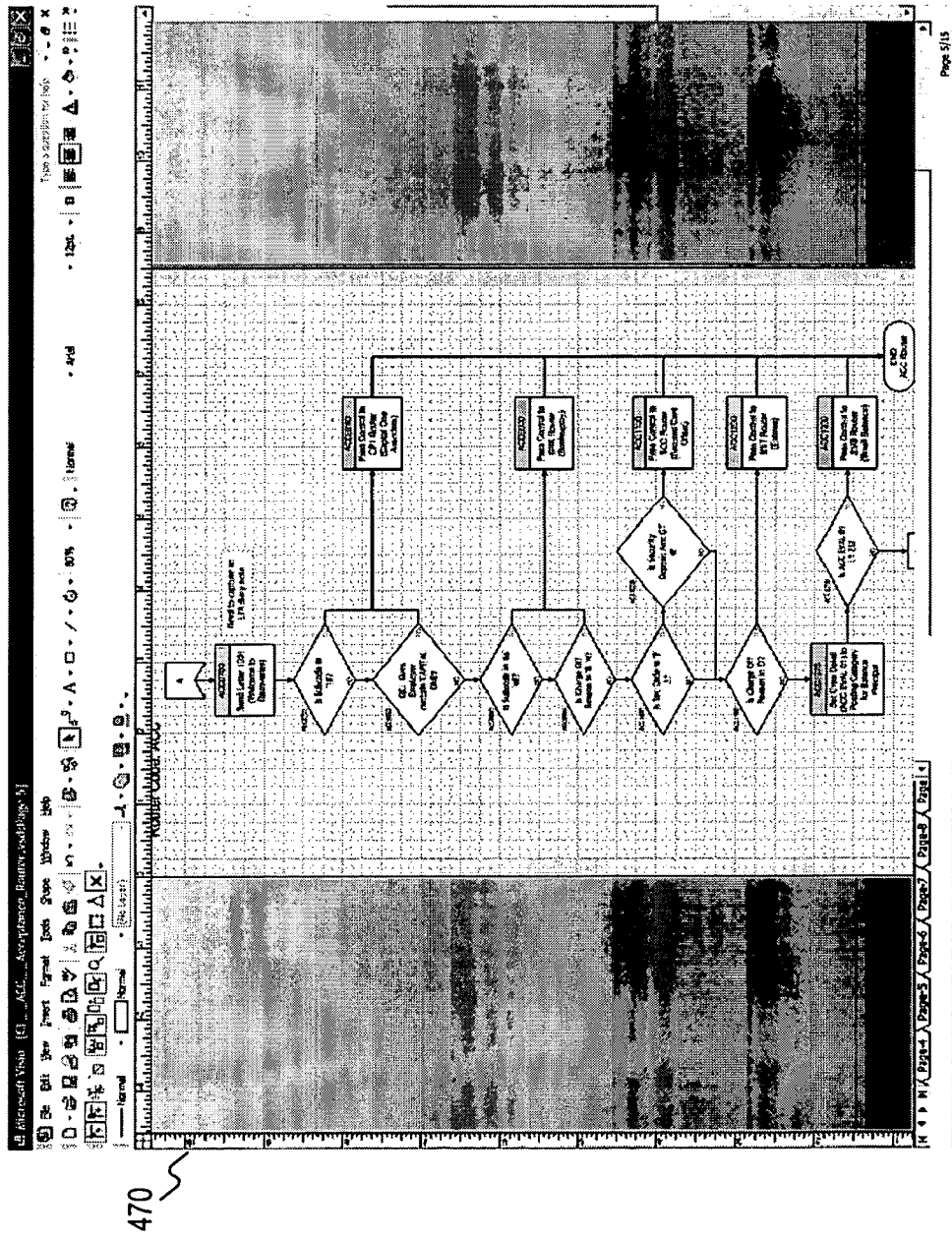

More complex requirements may utilize, for instance, Excel® spreadsheets (see, e.g., spreadsheet 450 in FIG. 4C) to document the attributes and metadata of terms used in requirements. For example, with reference to FIG. 4C, a spreadsheet 450 may be provided that allows a user to document the file layout of data in an incoming data stream that feeds into the requirements. When the user issues a command to save the file layout in spreadsheet 450, automated software development and implementation system 100 may intercept the save command and apply the appropriate changes to the terms stored in database 120. More complex requirements may also be represented as use cases in Word®, flow diagrams in Visio® drawings (see, e.g. flow diagram 470 in FIG. 4D) and/or combinations of formats. For example, with reference to FIG. 4D, a flow diagram 470 may be provided that allows a user to document the workflow of the requirements. When the user issues a command to save the workflow represented in flow diagram 470, automated software development and implementation system 100 may intercept the save command and apply the appropriate changes to database 120.

The user may also enter test cases for the project through a test case entry form 112. Entry form 113 allows the project personnel to alter test data in a test data storage 114. Although three exemplary entry forms are shown in FIG. 1, a software development system may have more entry forms for various types of inputs. Further, one or more glossaries having multiple attributes ("multidimensional glossaries"), an example of which is shown as element 120c, may be provided to guide and restrict user entry via entry forms 110-112. A detailed discussion of the multidimensional glossaries is provided below with reference to of FIG. 2.

Database 120 serves as the main repository and storage for the automated software development and implementation system 100. Database 120, for example, stores for a project the business requirements, system requirements, test cases, multidimensional glossaries, design artifacts, and architecture components. Design artifacts address how the system accomplishes the functional requirements and include, for example, algorithms, input/output formats, interface descriptions, data definitions, and system architecture. Database 120 may comprise a single database or multiple databases. Moreover, database 120 is not platform-dependent or product-specific. Database technologies are well-known to one of ordinary skill in the art, and therefore require no further discussion.

The automated software development and implementation system 100 may utilize managed pieces of software to generate production code, requirements documentation, supporting documentation, test cases, and other deliverables directly from the parameter-based requirements. The managed software may be written in one or more language of choice, rather than that of the ultimate platform. The managed software is managed, but its output is not. Defects, source control, and version control centers around the managed software, which reduces the project's costs, risks, personnel, and complexity.

In one embodiment, a code generator 130 is provided to extract information stored in database 120 and generate production code. Code generator 130 may be a managed software application and may comprise commercial or custom-built software. For example, code generator 130 may comprise Oracle JDeveloper® for generating JAVA applications, Microsoft Front Page® for generating HTML Web pages, and Microsoft Visual Studio®. For instance, Microsoft Visual Studio® may utilize a UML architecture entered through Visio® to create code in a variety of underlying third generation programming languages (3GL), such as C++, BASIC, and C#. While FIG. 1 shows code generator 130 as being integrated into automated software development and implementation system 100, code generator 130 may be separate and independently managed from automated software development and implementation system. In one embodiment, code generator 130 extracts and evaluates business and system requirements 120*a-b* from database 120 against multidimensional glossaries 120*c* to generate production code 142, which is provided as input into a document and code control system 150. Code generator 130 is generally a relatively small application that is smaller in size compared to the production code it produces. There are a number of advantages of using code generator 130. For example, due to its small size relative to the production code it produces, code generator 130 is more manageable and less prone to bugs. Another advantage is that code generator 130 allows for version control, so when the project personnel change the template in the automated software development and implementation system, such as the template for determining the programming language of the production code, the change is propagated by code generator 130. With respect to version control, versioning is not limited to a linear process, thus some of the project personnel may be restricted from certain versions of code generator 130.

Code generator 130 allows for almost instantaneous change in production code if there is any addition, update, modification, or deletion made to requirements 120*a-b* or the terms contained in multidimensional glossaries 120*c*. Code generator 130 also minimizes subjective interpretation of the requirements by different project personnel, such as analysts and developers, because code generator 130 consistently and objectively generates code based on requirements 120*a-b* and the terms stored in multidimensional glossaries 120*c*.

Code generator 130 receives or extracts parameter-based requirements 120*a-b* stored in database 120, and based on the requirements, code generator 130 accesses the multidimensional glossaries 120*c* and other sources 120*e-f* to generate production code in manners as specified by templates, such as the desired programming languages, platform, formats and syntax, and levels of optimization. The project personnel may add, modify, update, or delete templates to specify the desired programming languages, platform, formats and syntax, and levels of optimization of the generated production code. For example, the project personnel may create various templates for generating production code 142, such as in the C++ programming language with high level of optimization or in Java® with moderate level of optimization. Production code 142 generated by code generator 130 is stored and managed by automated software development and implementation system 100, so users with proper authorization may access and view the production code.

Document generator 131 may be a managed software application that extracts information stored in database 120 and generates detailed documentation for project requirements and test cases. Document generator 131 may be a commercial or custom-built software application. While FIG. 1 shows document generator 131 as being integrated into automated software development and implementation system 100, document generator 131 may be separate and independently managed from automated software development and implementation system 100. In one embodiment, document generator 131 extracts and evaluates business and system requirements 120*a-b* from database 120 against multidimensional glossaries 120*c* to generate business and system requirement documentation 143 and one or more requirement traceability matrix 144, which are inputted into document and code control system 150. Requirement traceability matrix 144 may be a report from the requirements database or repository. Requirement traceability matrix 144 is created by associating requirements with the work products that satisfy the requirements. Traceability matrix 144 is used to verify that all stated and derived requirements are allocated to system components and other deliverables in a forward trace. The traceability matrix is also used to determine the source of requirements in a backward trace. Moreover, traceability matrix 144 is used to ensure all requirements are met and to locate affected system components when there is a requirements change. The ability to locate affected components allows the impact of requirements changes on the system to be determined, facilitating cost, benefit, and schedule determinations. Traceability ensures completeness, that all lower level requirements come from higher level requirements, and that all higher level requirements are allocated to lower level requirements.

Document generator 131 may be manually or automatically activated, for instance, periodically or when the project personnel completes a requirement. When activated, document generator 131 receives or extracts parameter-based requirements 120*a-b* stored in database 120, and based on the requirements, accesses multidimensional glossaries 120*c* and other sources 120*d-f* to generate requirements documentations, supporting documentations, test cases, and traceability matrices in formats specified by document templates. The project personnel may add, modify, update, or delete document templates to specify the format and content of the generated documentations. For example, the project personnel may create various document templates for generating business and system requirements documentation 143, requirements traceability matrices 144, and test cases 132. Documentation generated by document generator 131 are stored and managed by the automated software development and implementation system so users with proper authorization may access and view the requirements documentation 143 and other supporting documentation. Furthermore, document generator 131 extracts test cases 120*d* from database 120 to generate test cases 132, which are inputted into a requirements simulator 122 and a test management system 151 to be described below.

Requirements simulator 122 extracts information stored in database 120 and test data storage 114, and executes the requirements. Requirements simulator 122 may be a commercial or custom-built software application. For example, requirements simulator 122 may be created using a database language such as Oracle PL/SQL® or using a decisioning system such as Fair Isaac's Blaze Advisor®. The underlying simulation platform for requirements simulator 122 may also be traditional 3GL's, such as C++, JAVA, or BASIC. While FIG. 1 shows requirements simulator 122 as being integrated into automated software development and implementation system 100, requirements simulator 122 may be separate and independently managed from the automated software development and implementation system 100. Requirements simulator 122 may be manually or automatically activated, for instance, periodically or when the project personnel completes a requirement.

In one embodiment, requirements simulator 122 captures requirements 120*a-b* from database 120 and extracts terms stored in multidimensional glossaries 120*c* to build executable requirements models. Requirements simulator 122 is capable of analyzing and simulating the executable requirements models to ensure requirements correctness. Executable requirements models, such as state chart simulators, may allow static and dynamic analysis of the requirements, either in isolation or in relation to other requirements or both, and the requirements' properties prior to implementation. Requirements simulator 122 also has the capability to execute the requirements models and generate expected test results 133 using test cases 132 and test data 114 on a test case by test case basis, or alternatively, through test case automation. An exemplary target system 135, if available, may also extract test data 114 during execution to generate actual results 146.

Figure 4E:
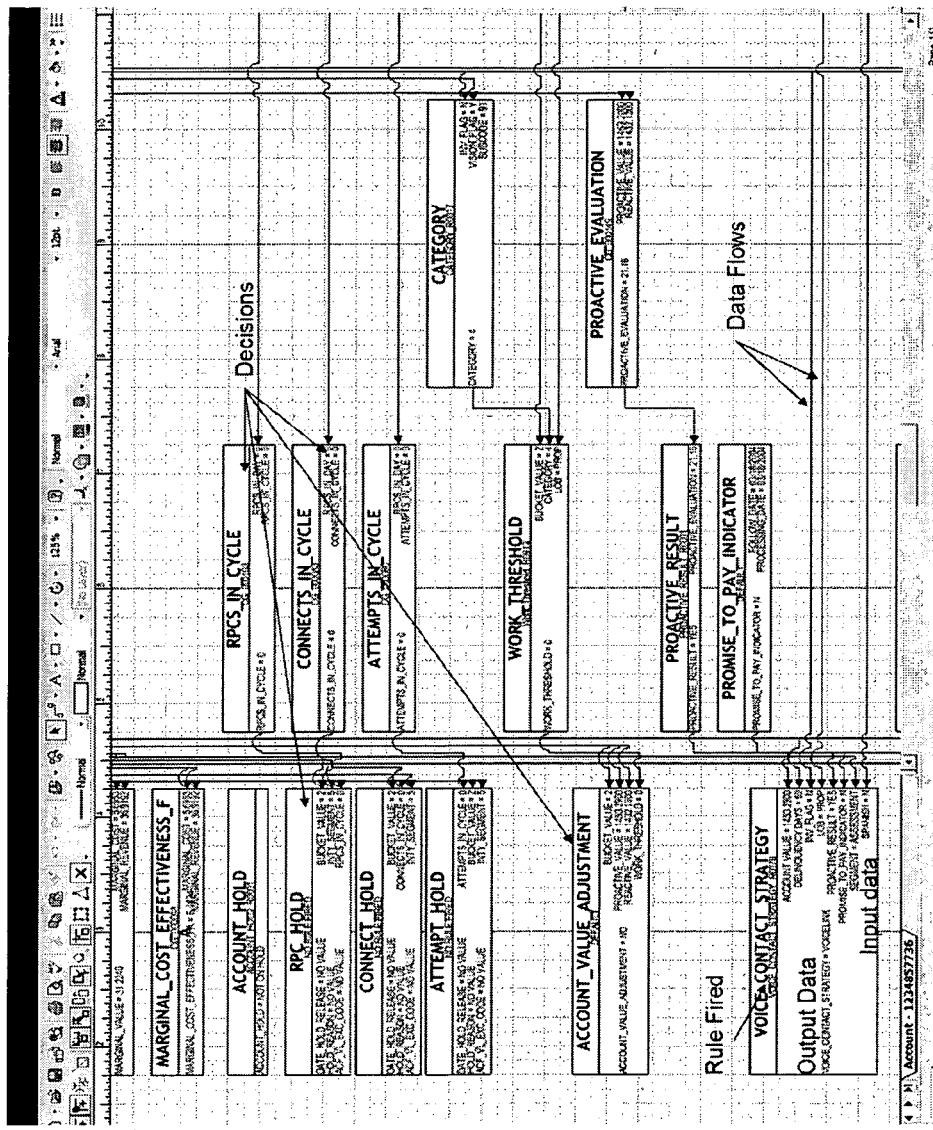
FIG. 4E illustrates exemplary test execution flow diagrams for testing parameter-based requirements.

Test case automation allows for exhaustive simulation and testing of one or more requirements through automated execution of a select group of test cases. Requirements simulator 122 generates expected test results 133 and test execution flow 134, which are inputted into test automation analysis 145. Exemplary test execution flow 134 contains a process flow diagram of execution, an example of which is shown in FIG. 4E to be described below. Test execution flow 134 may incorporate data such as base terms, intermediate terms, and executed rules. Furthermore, test execution flow 134 may provide for navigation through hyperlinks, such as hyperlinks associated with relevant terms stored in multidimensional glossaries 120*c*. Test execution flow 134 allows the user (e.g., tester) of the requirements and design artifacts to view some or all of the information related to the requirements. For instance, if the user is examining a requirement that uses a business term from the glossary, the definition of the term may be provided to the user in the form of a tool tip (e.g., a balloon that displays text) as the user hovers the mouse over the term. If the requirement references another document such as a business case, a visual cue may be displayed to the user to provide the user instant access to the related document. This may eliminate duplicate data by referencing only a single source and may allow instant access to related information to speed the information intake of the user.

Through simulation, requirements simulator 122 provides system 100 the capability to provide fast simulation of new or modified requirements, terms, or both. This capability allows project personnel and users to conduct "what if" analyses, such as a change in account data, a change in business logic, a change in data sources, or a combination thereof. Fast simulation allows for identification of population effects of requirements or strategy changes, such as the number of accounts affected by the changes, the number of agents that could be reallocated, the number of mailings that could be avoided, or the change in each account's treatment.

Test automation analysis 145 receives expected test results 133, test execution flow 134, and if available, actual results 146. Test automation analysis 145 may be automatically generated from the requirements and the results of test automation analysis 145 may be stored in an optimum format for easy analysis. For instance, if a requirement makes numerous decisions based on underlying data, test automation may be implemented to discover the expected values of the target system and to validate and record the test results in formats that facilitate analysis. Test automation analysis 145 may detect defects, such as discrepancies between expected test results and actual results produced by the target system, and then report the detected defects to defect management 152.

Report generator 136 may generate management reports, such as requirement management reports 140 and test management reports 141, that provide an overview of project requirements and test cases and test results. Report generator 136 may use commercial or custom-built reporting tools, or a combination thereof. Report generator 136 may use or be provided as part of the same software application as code generator 130 or document generator 131. In one embodiment, report generator 136 extracts business and system requirements from database 120 to generate requirement management reports 140, and extracts test cases and test results from database 120 to generate test management reports 141. Although not shown in FIG. 1, report generator may also extract data from test management 151 to generate test management reports 141. Test management 151 stores and manages versions of test cases along with test results 133 associated with the test cases, such as pass and fail data for each test case.

Report generator 136 may be manually or automatically activated, for instance, periodically, when the project personnel completes a requirement, or when a test has been completed. When activated, report generator 136 receives or extracts the parameter-based requirements stored in database 120, and based on the requirements, accesses multidimensional glossaries 120*c* and other sources 120*d-f* to generate requirements management reports 140 and test management reports 141 in formats specified by report templates. The project personnel may add, modify, update, or delete report templates to specify the format and content of the generated reports.

Figure 2:
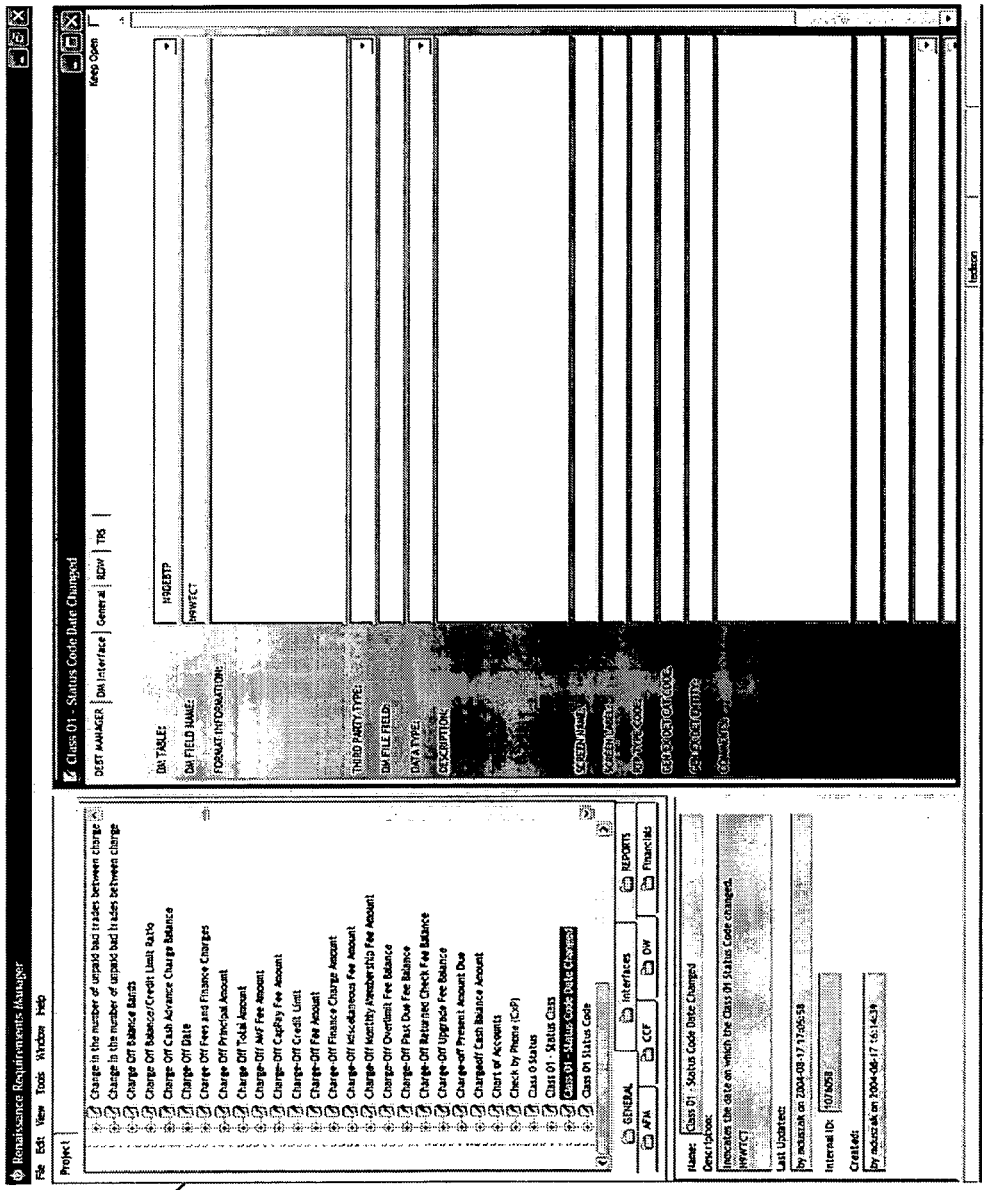
FIG. 2 illustrates an exemplary glossary of terms having multiple attributes.

FIG. 2 illustrates an exemplary multidimensional glossary 200, consistent with the present invention, for storing terms and the terms' definitions and attributes in a structured format. Multidimensional glossary 200 may include any number of attributes for the terms. The attributes may be grouped in a meaningful way, such as for organizational purposes, e.g., metadata for storage locations and the terms' data type.

The stored terms may be used for automated development and implementation of various deliverables of a software project, such as requirements, requirements documentations, supporting documentations, design artifacts, test cases, management reports, and production code. Multidimensional glossary 200 may contain common terms that may be industry-specific or company-specific and the terms' associated definitions and attributes realized by the project personnel. For an exemplary requirement of "if account balance is greater than one hundred dollars, then have the account balance charge off," automated software development and implementation system (FIG. 1, element 100) requires a definition for each of the terms contained in the exemplary requirement, such as "account balance." The project personnel, using a definition for "account balance" in the multidimensional glossary 200, may assess the attributes for "account balance." For example, the project personnel may use the definition to determine the source of "account balance", which may be an account database or a third party. Other metadata or attributes for the term stored in the multidimensional glossary 200 may describe and define, for example, where the data is going to, who uses the term, where is the data in the legacy system, and where the data will be in the new system.

Multidimensional glossary 200 may also include design artifacts (e.g. FIG. 1, element 102e) and architecture components (e.g., FIG. 1, element 120f). Further, multidimensional glossary 200 may provide the project personnel an overview of the requirements and the terms therein from a business perspective. In providing a business perspective, multidimensional glossary 200 can assist the project personnel to validate the requirements. For instance, to verify the production code, the test team may generate test data by retrieving actual data from the source indicated in the definitions of the terms used in requirements.

Consistent with an embodiment of the invention, multidimensional glossary 200 is dynamic in the number (e.g., dimension) of attributes. By having dynamic dimensions of attributes, multidimensional glossary 200 builds a flexible architecture for standardization of terms and requirements generation, plus automated testing, documentation, communications, report generation, and code generation. Each attribute of the terms stored in the glossary may include, for example, terms' sources, usage, hyperlinked references, expected range and type of data, data persistence, valid formats, validation rules, and design artifact. A person skilled in the art will appreciate that a multidimensional glossary may have more or less dimensions of attributes than in multidimensional glossary 200.

In one embodiment, the project personnel may first generate a task, and preliminarily enter a name and a meaning for a new term using graphical user interface 400, such as that described below with respect to FIG. 4A, while leaving the rest of the fields empty to be completed by other project personnel at a later phase of the project development and implementation. Examples of other project personnel include system analysts, designers, system architects, and developers. Thus, after the initial population, multidimensional glossary 200 may evolve by allowing the project personnel to create, enter, add, modify, update, and augment terms and their definitions. The project personnel may also alter the terms, for example, by adding a new attribute, removing an existing attribute, or modifying an existing attribute.

Furthermore, terms and their associated definitions and attributes may be logged, such as terms that are used in and referenced by the requirements. Automated software development and implementation system (FIG. 1, element 100) may log any additions, updates, modifications, or augmentations to terms and their definitions and attributes. Moreover, automated software development and implementation system 100 may propagate any additions, updates, modifications, or augmentations to terms and their definitions and attributes to various parts of the automated software development and implementation system, such as production code, requirements documentation, supporting documentations, test cases, and other deliverables. Using the "account balance" example above, a change in the storage location of "account balance" may be automatically reflected in corresponding test cases, production code, and requirement and supporting documentations.

Figure 3A:
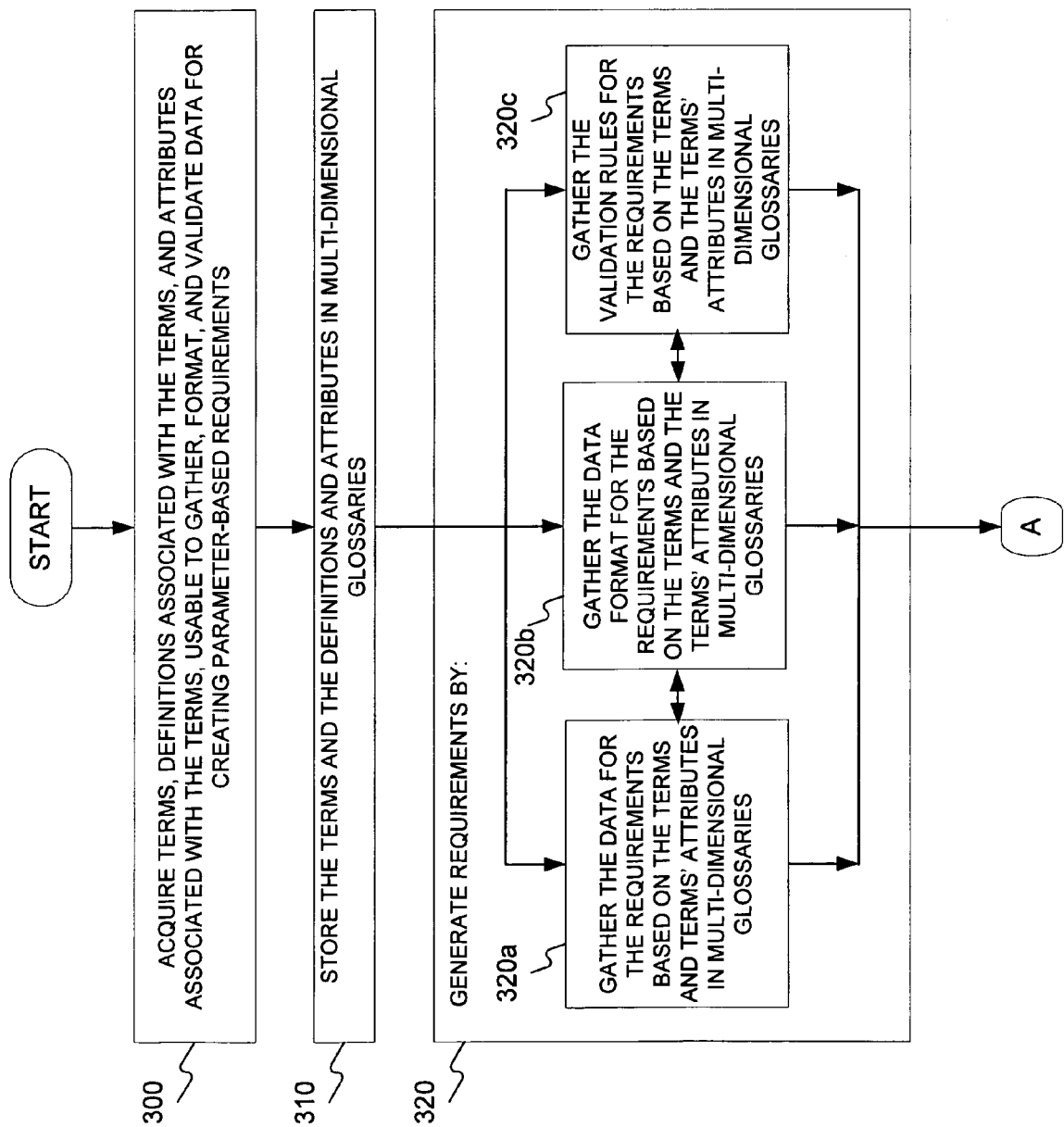
FIGS. 3A-3B show a flow chart for an exemplary process for automatically generating software code, design artifacts, test cases, requirements documentation, and supporting documentation.
Figure 3B:
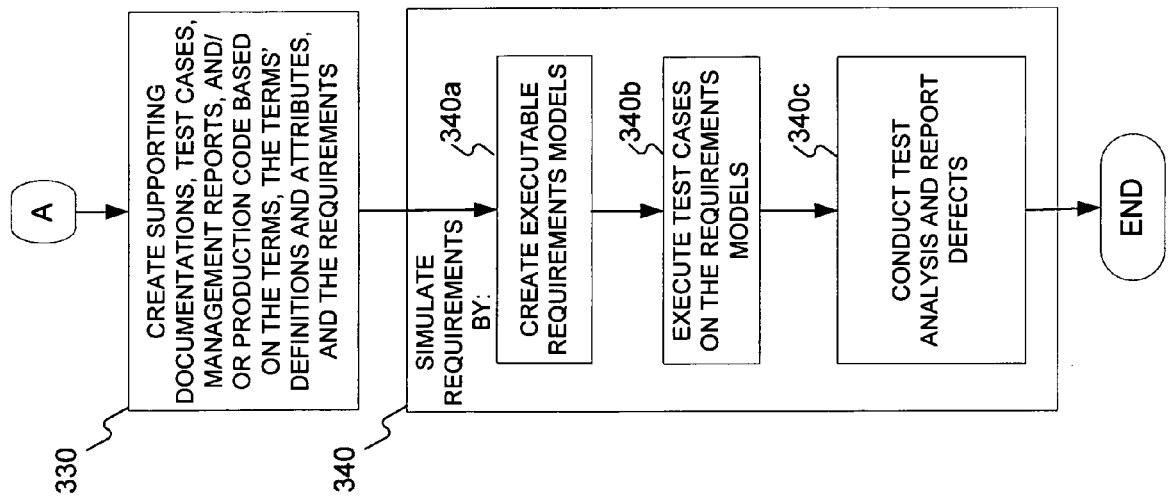

FIGS. 3A-3B illustrate a flowchart of an exemplary process for automated development and implementation of software code, design artifacts, test cases, requirements documentation, and supporting documentation by creating and using leverageable requirements, consistent with the present invention. In one embodiment, the process begins in stage 300 by acquiring terms, definitions associated with the terms, and attributes associated with the terms, usable to create parameter-based requirements for the software project. Project personnel, such as business analysts and business system analysts, determine what information is required to create a complete requirement. In doing so, the project personnel determine ways to gather, format, and validate terms and terms' attributes which make up a requirement.

The project personnel makes an initial determination of the requirement types and their properties, which may be augmented as the project progresses. In one embodiment, the project personnel may use graphical interface 400 described below with respect to FIG. 4A to create, enter, add, modify, update, and augment terms and attributes that constitute requirements. The project personnel may initially enter a name and a meaning for a new term, while leaving the rest of the fields empty to be completed by other project personnel at a later phase of the project development and implementation. For example, the process generates tasks based on the newly entered term, then passes the task to other project personnel, such as business system analysts, to populate the rest of the fields. At this point, a business system analyst can check out a task, provided that the business analyst has proper authorization or permission to check out the task, and the task has not been checked out by another personnel.

After a successful checkout, the business system analyst may enter data for other fields such as the term's sources, usage, hyperlinked references, expected range and type of data, data persistence, valid formats, validation rules, and design artifact. The business system analyst may also modify, update, and augment existing data in the terms. Moreover, the business system analyst may alter the terms, for example, by adding a new attribute, removing an existing attribute, or modifying an existing attribute. When the business system analyst has entered the desired fields, the task is checked in and made available for other project personnel to check out and modify, update, or augment the newly entered term. While only the project personnel who has checked out the task may modify, update, or augment the terms contained in the task, the terms may be accessed, viewed, and utilized by members of the project personnel without being checked out.

Depending on the nature of the requirement, the process of acquiring terms usable to create the requirement may take on any number of configurations. For example, a requirement for a graphical user interface ("GUI") may need to include the data format and value of a database value. If the GUI requirement is gathered using a form, the form may include a choice of acceptable data formats and whether the form should be read-only or writeable depending on the user's profile or authorization. The form may ask for the expected data type, range of data, and business term being displayed or prompted and the label for the prompt. The form may also speak to the validation rules required of the system. If the format of the requirement could be written such that these attributes could be prompted and validated and the creation of the input mechanism was simple and fast, the resulting requirement would be more succinct, repeatable, and leverageable than the free-form requirement of traditional projects.

Next, in stage 310, the terms and the terms' attributes acquired in stage 300 for generating requirements are stored in a multidimensional glossary (e.g. FIG. 1, element 120c; FIG. 2, element 200). In one embodiment, the process maintains the terms and attributes stored in multidimensional glossaries in an open format such as relational databases or extensible markup language ("XML"). When the process maintains the terms and the terms' attributes in such an open format, the generated requirements become highly leverageable. For instance, the process can document the terms and attributes from the database into a scripting word processor, such as Microsoft Word®, to generate on-demand documentation. Any missing information can be quickly ascertained through simple database queries or management reports or both. Inconsistencies can be automatically queried and documented. The process can automatically generate test cases and scripts into testing environments, such as Mercury's Test Director® or Rational Software's Robot®. The process can automatically script production code from the requirements generated from the terms and attributes into various languages, such as $3^{rd}$ Generation Languages like C++, PL/SQL®, Java®, and Microsoft Visual Basic®, and $4^{th}$ Generation Languages like Blaze Advisor®, Gensym G2®, and Microsoft Front Page®.

The level of automation can also extend to other aspects of project development and implementation, such as project planning, version control, release management, defect workflow, traceability, and operation and maintenance. Each of the above listed activities, from automated generation of documentations to operation and maintenance, is greatly simplified and enhanced by leveraging the requirements directly. As the process modifies and extends the requirements, most the activities described above can execute with minimal or no change.

In stage 320, the process generates requirements by eliciting requirements from the project personnel. The process may utilize any number of input mechanism to elicit requirements, and does so in a reproducible, flexible manner. For example, the process restricts and prompts the project personnel for required or useful information to create requirements based on the terms stored in multidimensional glossaries 120c. When gathering requirements using the stored terms, the process constrains input from the project personnel to, for example, the content, format, and validation rules as specified by the terms. In this manner, the process creates a repeatable, succinct, and leverageable set of requirements that are parameter-based.

For example, in stage 320a, the process may first create a GUI requirement entity, which includes a many to one relationship between inputs and the requirement. Each input is captured and related to the requirement. Each input is associated with at least one term defined by the business within multidimensional glossaries 120c for use within automated software development and implementation system 100. For instance, in order to create the GUI requirement to obtain the customer's name, the process prompts the project personnel to define first and last names, address, and social security number (SSN). To define the terms in the GUI requirement, the process prompts the project personnel or user to input attributes for each of the terms used in the GUI requirement. For example, the process may prompt the project personnel for the source of input data for first and last names, address, and SSN, which in this example is limited to direct customer input, databases at a credit bureau, or an internal customer information repository. As a further example, the process may also prompt the project personnel for the source of input data for credit information and scores, which may be limited to databases at a credit bureau or an internal credit information repository.

In stage 320b, the process prompts the project personnel for data presentation format based on the terms' attributes, such as presenting and formatting the customer's birth date in either mm/dd/yy or mm-dd-yyyy format. In stage 320c, the process also prompts the project personnel to input, based on the terms' attributes, at least one validation rule which dictates the system's action when a certain condition is met, such as return an error message when the zip code is left blank or when the entered zip code does not correspond to the entered state of residence.

The parameter-based requirements can take on any structured format that contains metadata and stores relationships between data elements, such as XML and relational databases. The process, by utilizing the parameter-based requirements, allows project personnel to design, develop, and test deliverables as a function of the requirements rather than an interpretation of the requirements.

By creating a set of parameter-based requirements 120a-b that is computer-readable, the process in stage 330 may utilize document generator 131 to automatically generate project requirements documentation 143 and other supporting documentations with little to no human interpretation. For example, the process may generate requirements documentation 143 using definitions and attributes of terms contained in the requirements. Requirements documentation 143 may contain, in various level of detail, the terms' definitions and attributes in the requirements. Requirements documentation 143 may include the meaning, usage, sources of input data, valid formats, and validation rules for the requirements. The meaning and usage of each of the terms may include first and last names, birth date, address having a zip code, and SSN. The sources of input data may include, for example, direct customer input, databases at a credit bureau, or an internal customer information repository. The valid format for the birth date may be either mm/dd/yy or mm-dd-yyyy. The valid format for the SSN is a nine digit number with a dash after the third and fifth digits. The validation rules may dictate that the system take action if, for example, the zip code is left blank or the zip code does not correspond to the state of residence. One skilled in the art will appreciate that requirements documentation 143 is not limited to the format, level of detail, or the content of requirements documentation 143 for requirements 120a-b as described above.

Further, in stage 330, the process may utilize the document generator to extract test cases from database 120 to generate test cases 132, which are inputted into requirements simulator 122 and test management system 151 to simulate the requirement in a controlled test environment. Moreover, the process in stage 330 may use report generator 136 to generate management reports, such as requirements management reports 140 and test management reports 141. In stage 330, the process may also use code generator 130 to generate production code 142.

In stage 340, the process simulates the requirements by extracting information stored in database 120 and test data storage 114 and by executing the parameter-based requirements. For example, in stage 340a, the process may capture requirements from database 120 and extract terms stored in multidimensional glossaries 120c to build executable requirements models. The process may analyze and simulate the executable requirements models to ensure requirements correctness. The process may, in stage 340b, execute the requirements models and generate expected test results 133 using test cases 132 and test data 114 on a test case by test case basis, or alternatively, through test case automation 145. The process may also generate actual results 146 by having exemplary target system extract test data 114 during execution.

By executing the requirements models, in stage 340c, the process may conduct test automation analysis using expected test results 133, test execution flow 134, and if available, actual test results 146. Test execution flow 134 may contain a process flow diagram (e.g., flow diagram 490 in FIG. 4E) of execution. Test execution flows (FIG. 1, element 134; FIG. 4E, element 490) are derived while executing the requirements models. As the requirements models execute, the test execution flows record in database 120 the sequence of execution that contributed to the execution results of the models. Using this sequence, automated software development and implementation system 100 may automatically generate a visual test execution flow (e.g., FIG. 4E, element 490) to facilitate user analysis of defects. The process may detect and report the defects to defect management 152. Furthermore, test execution flow (e.g., FIG. 1, element 134; FIG. 4E, element 490) may provide for navigation through hyperlinks such as hyperlinks associated with relevant terms stored in multidimensional glossaries 120c.

The process in stage 340 provides automated software development and implementation system (FIG. 1, element 100) the capability to provide fast simulation of new or modified requirements, terms, or both. Fast simulation allows for identification of population effects of requirements or strategy changes, such as the number of accounts affected by the changes, the number of agents that could be reallocated, the number of mailings that could be avoided, or the change in each account's treatment.

To further illustrate the process in stages 300-340, an example is provided on how the automated software development and implementation process, consistent with the present invention, can generate a system requirement in a manner different than in traditional software development. Assume, for instance, a set of traditional system requirements contain the following five sample requirements:

Requirement 1: The system shall capture customer's personal information and then record that information in a central data repository.

Requirement 2: The system shall utilize credit information, internal models, and external score or scores to determine if the proposed loan is appropriate for the customer and if so calculate a risk-based annual percentage rate for the loan.

Requirement 3: The system will communicate the results of the loan approval back to the entering party as to whether the loan was approved or denied along with any supporting information.

Requirement 4: The data used for the making the decision in requirement 2 will be persisted and be retrievable for no less than 5 years.

Requirement 5: The results of the approval process and supporting documentation will be sent as a letter to the customer's recorded address within 48 hours of approval or denial.

The exemplary automated software development and implementation process, consistent with the present invention, first parameterizes several terms in the requirements by acquiring the terms' definitions in stage 300. For example, the process determines what is meant by "customer's personal information" in sample Requirement 1 by acquiring the definition and at least one attribute of "customer's personal information." The process acquires from the project personnel the attributes for the term "customer's personal information," which contains, for example, the meaning, usage, sources of input data, valid formats, and validation rules for the term. The meaning and usage of "customer's personal information" may include first and last names, birth date, address having a zip code, and SSN. The process may also acquire, from the project personnel, attributes for one or more of the term's attribute. For instance, the process may identify SSN as part of "customer's personal information," and define the format of the SSN and determine the SSN's usage in other parts of the application and the SSN's location in the data store. The sources of input data may include, for example, direct customer input, databases at a credit bureau, or an internal customer information repository. The valid format for the birth date may be either mm/dd/yy or mm-dd-yyyy. The valid format for the social security number is a nine digit number with a dash after the third and fifth digits. The validation rules allows the project personnel, when prompted by the process for data to create requirements, to dictate the system's action if, for example, the zip code is left blank or the zip code does not correspond to the state of residence. Validation rules may be applied at different levels, such as at the term level in relation to other terms in the requirement, or at a GUI level when the data is entered at the GUI prompt. After acquiring the terms' definitions and attributes in stage 300, the process in stage 310 stores the acquired definitions and attributes in one or more multidimensional glossaries 120c.

In stage 320, the process creates requirements by eliciting requirements from the project personnel based on the terms and the terms' attributes in multidimensional glossaries 120c. For example, in stage 320a, the process may first create a GUI requirement entity, which includes a many to one relationship between inputs and the requirement. Each input is captured and related to the requirement. Each input is associated with at least one term defined by the business within multidimensional glossaries 120c for use within automated software development and implementation system 100. For instance, in order to create the GUI requirement to obtain the customer's name, the process prompts the project personnel to define first and last names, address, and social security number. To define the terms in the GUI requirement, the process prompts the project personnel or user to input attributes for each of the terms used in the GUI requirement. For example, the process may prompt the project personnel for the source of input data for first and last names, address, and social security number, which in this example is limited to direct customer input, databases at a credit bureau, or an internal customer information repository. As a further example, the process may also prompt the project personnel for the source of input data for credit information and scores, which may be limited to databases at a credit bureau or an internal credit information repository.

In stage 320b, the process prompts the project personnel for data presentation format based on the terms' attributes, such as presenting and formatting the customer's birth date in either mm/dd/yy or mm-dd-yyyy format. In stage 320c, the process also prompts the project personnel to input, based on the terms' attributes, at least one validation rule which dictates the system's action when a certain condition is met, such as return an error message when the zip code is left blank or when the entered zip code does not correspond to the entered state of residence.

After creating a set of parameter-based requirements that is computer-readable, the process in stage 330 may utilize a document generator 131 to automatically generate project requirements documentations 143 and other supporting documentation with little to no human interpretation. For example, the process may generate requirements documentation for sample Requirement 1 using the definitions and attributes of terms contained in Requirement 1. The requirements documentation may contain, in various level of detail, the definition and attributes for the term "customer's personal information" in sample Requirement 1. The requirements documentation may include the meaning, usage, sources of input data, valid formats, and validation rules for sample Requirement 1. The meaning and usage of "customer's personal information" may include first and last names, birth date, address having a zip code, and social security number. The sources of input data may include, for example, direct customer input, databases at a credit bureau, or an internal customer information repository. The valid format for the birth date may be either mm/dd/yy or mm-dd-yyyy. The valid format for the social security number is a nine digit number with a dash after the third and fifth digits. The validation rules may dictate that the system take action if, for example, the zip code is left blank or the zip code does not correspond to the state of residence. One skilled in the art will appreciate that requirements documentation is not limited to the format, level of detail, or the content of the requirements documentation for sample requirement 1 as described above.

In stage 330, the process may utilize document generator 131 to extract test cases from database 120 to generate test cases 132, which are inputted into requirements simulator 122 and test management system 151 to simulate the requirement in a controlled test environment. The process in stage 330 may use report generator 136 to generate management reports, such as requirements management reports 140 and test management reports 141. In stage 330d, the process may use code generator 130 to generate production code.

In stage 340, the process simulates the requirements by extracting information stored in database 120 and test data storage 114 and by executing the parameter-based requirements. For example, in stage 340a, the process may capture requirements from database 120 and extract terms and the terms' attributes stored in multidimensional glossaries 120c to build executable requirements models. An exemplary process for creating models may include the extraction of highly structured terms and attributes from the multidimensional glossary and the translation of the extracted terms and attributes into executable models. Code generator 130 may access data storage locations (e.g., database 120) for multidimensional glossaries 120c, the file layouts, and the work flow requirements as stored in automated software development and implementation system 100 and automatically generate code that completely models the requirements' intent. The resulting model may be generated in an appropriate language and executed against the same process data that would be executed against the production code. The exemplary process may analyze and simulate the executable requirements models to ensure requirements correctness. The process may, in stage 340b, execute the requirements models and generate expected test results 133 using test cases 132 and test data 114 on a test case by test case basis, or alternatively, through test case automation. The process may also generate actual results (e.g. FIG. 1, element 146) by having exemplary target system extract test data during execution.

By executing the requirements models, in stage 340c, the process may conduct test automation analysis 145 using expected test results 133, test execution flow 134 and, if available, actual test results 146. Test execution flow 134 may contain a process flow diagram of execution (see, e.g., flow diagram 490 in FIG. 4E). Test execution flow 134 may be derived while executing the automatically generated requirements models. As the models execute, automated software development and implementation system 100 may record in database 120 at least one sequence of execution through the requirements that contributed to the one or more results from the models' execution. Automated software development and implementation system 100 may then read the sequence and automatically generate a visual test execution flow (see, e.g., flow diagram 490 in FIG. 4E) to facilitate defect analysis. By having a visual test flow, a user may ascertain root cause of defects in substantially less time.

The process may detect and report the defects to defect management 152. Furthermore, test execution flow 134 may provide for navigation through hyperlinks such as hyperlinks associated with relevant terms stored in multidimensional glossaries 120c. Once the requirements have been modeled, the models may be executed against a set of test data to compare the output against business expectations. This validation may be completely automated and the results of the validation may be automatically reported to all users.

The process in stage 340 provides automated software development and implementation system 100 the capability to provide fast simulation of new or modified requirements, terms, or both. Fast simulation allows for identification of population effects of requirements or strategy changes, such as the number of accounts affected by the changes, the number of agents that could be reallocated, the number of mailings that could be avoided, or the change in each account's treatment.

Figure 5:
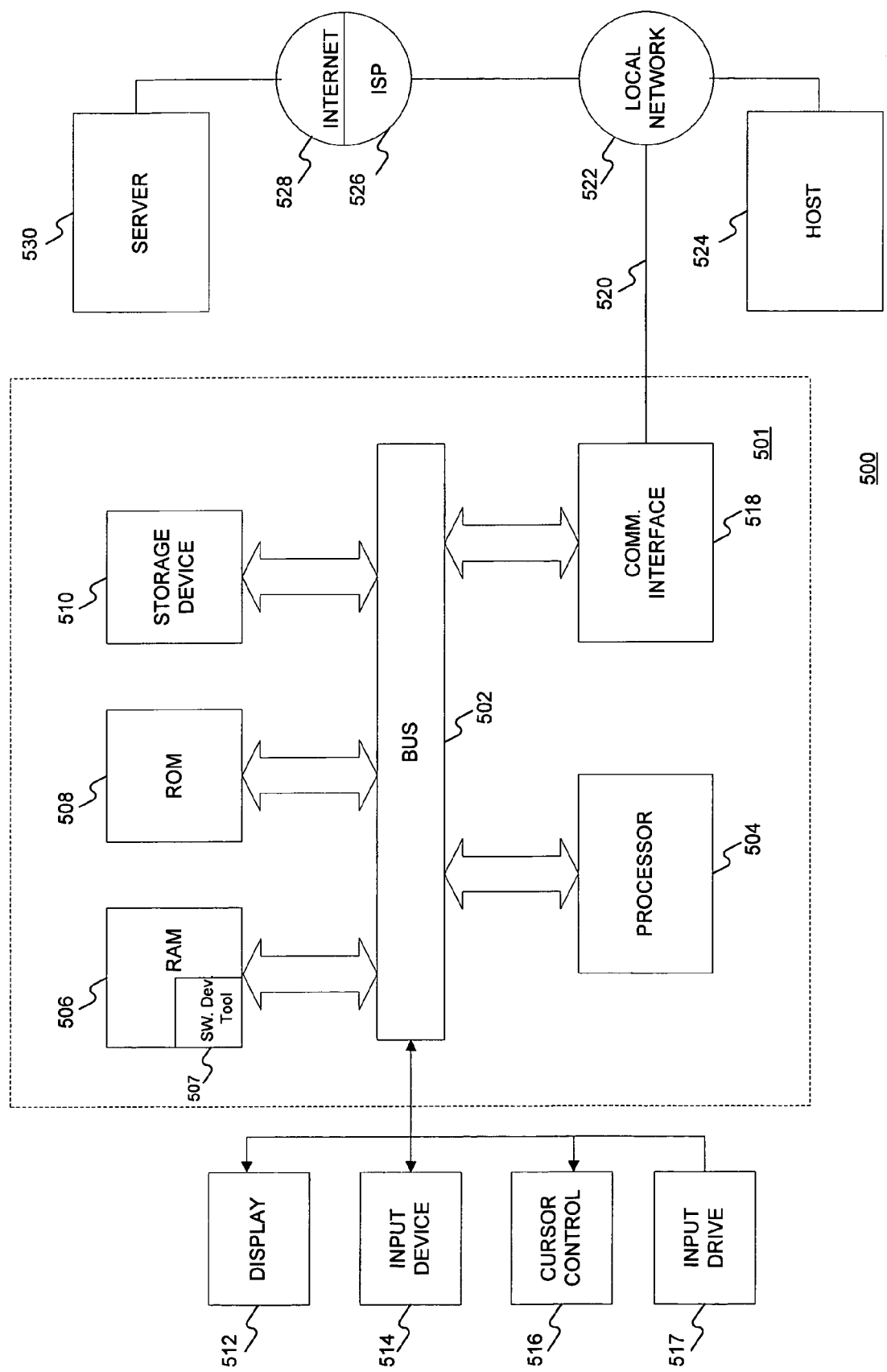
FIG. 5 shows a block diagram of an exemplary system for automated software development and implementation.

Systems and methods consistent with the present invention may be implemented by computers organized in a conventional distributed processing system architecture. FIG. 5 is a block diagram illustrating a computer system 500 in which an embodiment consistent with the invention may be implemented. Computer system 500 includes a computer 501 having a bus 502 or other communication mechanism for communicating information, and a processor 504 coupled with bus 502 for processing information. Computer 501 also includes a main memory, such as random access memory (RAM) 506 or other dynamic storage device, coupled to bus 502 for storing information and instructions to be executed by processor 504. RAM 506 also may be used for storing temporary variables or other intermediate information during execution of instructions to be executed by processor 504. Computer 501 may further include a read only memory (ROM) 508 or other static storage device coupled to bus 502 for storing static information and instructions for processor 504. A storage device 510, such as a magnetic disk or optical disk, may be provided and coupled to bus 502 for storing information and instructions.

Computer 501 may be coupled via bus 502 to a display 512, such as a cathode ray tube (CRT), for displaying information to a computer user. An input device 514, such as a keyboard including alphanumeric and other keys, is coupled to bus 502 for communicating information and command selections to processor 504. Another type of user input device is cursor control 516, such as a mouse, a trackball or cursor direction keys for communicating direction information and command selections to processor 504 and for controlling cursor movement on display 512. This input device typically has two degrees of freedom in two axes, a first axis (e.g., x) and a second axis (e.g., y), which allow the device to specify positions in a plane. System 500 may further include an input drive device 517, such as a CD reader, for reading high-capacity computer-readable media, such as CD-ROMs and CDRs.

According to one implementation, systems and methods consistent with the present invention provide for automated generation of software code, design artifacts, test cases, requirements documentation, and supporting documentation by creating and using leverageable requirements when processor 504 executes one or more sequences of instructions, such as a software development tool 507, contained in RAM 106. Such instructions may be read into RAM 506 from a computer-readable medium via an input device such as storage device 510. Execution of the sequences of instructions contained in main memory 506 causes processor 504 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer-readable media may be involved in carrying one or more sequences of instructions to processor 504 for execution. For example, the instructions may initially be carried on the magnetic disk of a remote computer. The remote computer can load the instructions into its dynamic memory and send the instructions over a telephone line using a modem. A modem (not shown) local to computer system 500 can receive the data on the telephone line and supply the data to computer 501 via a communications interface 518, which places the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 may also provide a two-way data communication coupling to a network link 520 that may be connected to a local network 522. For example, communication interface 518 may support an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 and/or to data equipment operated by an Internet Service Provider (ISP) 526. ISP 526, in turn, provides data communication services through the Internet 528. Local network 522 and Internet 528 both use electric, electromagnetic, or optical signals to carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520, and communication interface 118. In the Internet example, a server 530 might transmit requested program instructions for an application program through Internet 528, ISP 526, local network 522, and communication interface 518. Consistent with the present invention, one such downloaded application in the form of a software development tool 507 comprising a module for automated software implementation using a structured format to generate requirements, requirements documentations, supporting documentation, test cases, management reports, and software code. The received application code may be loaded in RAM 506 and executed by processor 504 as it is received. Alternatively, or in addition, it may be stored in storage device 510, or other non-volatile storage for later execution. In this manner, computer system 500 may obtain application code in the form of a carrier wave.

Although computer system 500 is shown in FIG. 5 as being connectable to one server 530, those skilled in the art will recognize that computer system 500 may establish connections to multiple servers on Internet 528. Such servers may include. a client-server or an HTML-based Internet application, which may provide information to computer system 500 upon request in a manner consistent with the present invention.

While the present invention has been described in connection with various embodiments, many modifications will be readily apparent to those skilled in the art. One skilled in the art will also appreciate that all or part of the systems and methods consistent with the present invention may be stored on or read from computer-readable storage media, such as secondary storage devices, like hard disks, floppy disks, and CD-ROM; or other forms of ROM or RAM. Accordingly, embodiments of the invention are not limited to the above described embodiments and examples, but instead is defined by the appended claims in light of their full scope of equivalents.

What is claimed is:

1. A method for automated development and implementation of software, comprising:

acquiring a set of terms usable to generate at least one parameter-based requirement, wherein the terms include attributes;

storing, in a storage device, a glossary including the terms and the attributes;
collecting at least one system requirement from a user based on the terms stored in the glossary;
generating the at least one parameter-based requirement based on the terms stored in the glossary and the at least one system requirement, wherein the at least one parameter-based requirement is machine-executable;
creating an artifact based on the at least one parameter-based requirement, wherein the artifact comprises a test case;
generating a machine-executable requirements model based on the at least one parameter-based requirement, wherein said machine-executable requirements model is generated by a requirements simulator; and
executing said machine-executable requirements model via said requirements simulator in accordance with said test case, wherein said executing said machine-executable requirements model comprises:
  generating at least one expected result from said test case;
  deriving at least one test execution flow which incorporates term data and contains at least one process flow diagram representing a sequence of execution through said requirements model that contributed to the at least one expected result;
  displaying the at least one process flow diagram and at least one hyperlink related to said incorporated term data; and
  selecting the at least one hyperlink to navigate to a term definition, said term definition being stored in said glossary.

2. The method of claim 1, wherein collecting comprises collecting at least one business requirement from the user and the at least one parameter-based requirement is generated based on the at least one business requirement.

3. The method of claim 1, wherein a first one of the attributes comprises metadata selected from a group consisting of meaning, source, usage, persistence, hyperlinked references, validation rule, and design artifact.

4. The method of claim 1, wherein the artifact further comprises requirements documentation, supporting documentation, management report, or production code.

5. The method of claim 1, wherein storing comprises storing the glossary in an open format.

6. A method for developing and generating parameter-based requirements, comprising:
  acquiring a set of terms usable to generate at least one parameter-based requirement, wherein the terms include attributes;
  storing, in a glossary on a storage device, the terms and the attributes;
  receiving user input based on the terms stored in the glossary;
  generating the at least one parameter-based requirement based on the terms stored in the glossary and the user input, wherein the at least one parameter-based requirement is machine-executable;
  creating an artifact based on the at least one parameter-based requirement, wherein the artifact comprises a test case;
  generating a machine-executable requirements model based on the at least one parameter-based requirement, wherein said machine-executable requirements model is generated by a requirements simulator; and
  executing said machine-executable requirements model via said requirements simulator in accordance with said test case, wherein said executing said machine-executable requirements model comprises:
    generating at least one expected result from said test case;
    deriving at least one test execution flow which incorporates term data and contains at least one process flow diagram representing a sequence of execution through said requirements model that contributed to the at least one expected result;
    displaying the at least one process flow diagram and at least one hyperlink related to said incorporated term data; and
    selecting the at least one hyperlink to navigate to a term definition, said term definition being stored in said glossary.

7. The method of claim 6, wherein acquiring comprises acquiring terms usable to gather data for generating the at least one parameter-based requirement.

8. The method of claim 7, wherein acquiring comprises acquiring terms usable to format data for generating the at least one parameter-based requirement.

9. The method of claim 8, wherein acquiring comprises acquiring terms usable to validate data for generating the at least one parameter-based requirement.

10. The method of claim 7, wherein the user input is restricted based on the terms.

11. The method of claim 10, wherein generating the at least one parameter-based requirement comprises:
  formatting the at least one parameter-based requirement based on the terms and the user input; and
  validating the at least one parameter-based requirement based on the terms and the user input.

12. The method of claim 11, wherein the artifact further comprises requirements documentation, supporting documentation, a management report, or production code.

13. The method of claim 6, wherein acquiring comprises modifying the terms.

14. The method of claim 6, wherein acquiring comprises altering the attributes.

15. The method of claim 6, wherein an attribute among the attributes comprises metadata selected from a group consisting of meaning, source, usage, persistence, hyperlinked references, validation rule, and design artifact.

16. A system for developing and generating parameter-based requirements, comprising:
  means for acquiring a set of terms usable to generate at least one parameter-based requirement, wherein the terms include attributes;
  a storage device for storing the terms and the attributes in a glossary;
  means for receiving user input based on the terms stored in the glossary;
  means for generating the at least one parameter-based requirement based on the terms stored in the glossary and the user input, wherein the at least one parameter-based requirement is machine-executable;
  means for creating an artifact based on the at least one parameter-based requirement, wherein the artifact comprises a test case;
  means for generating a machine-executable requirements model based on the at least one parameter-based requirement, wherein said machine-executable requirements model is generated by a requirements simulator; and
  means for executing said machine-executable requirements model via said requirements simulator in accordance with said test case, wherein said executing said machine-executable requirements model comprises:

means for generating at least one expected result from said test case;

means for deriving at least one test execution flow which incorporates term data and contains at least one process flow diagram representing a sequence of execution through said requirements model that contributed to the at least one expected result;

means for displaying the at least one process flow diagram and at least one hyperlink related to said incorporated term data; and means for selecting the at least one hyperlink to navigate to a term definition, said term definition being stored in said glossary.

17. The system of claim 16, wherein the means for acquiring acquires terms usable to gather data for generating the at least one parameter-based requirement.

18. The system of claim 17, wherein the means for acquiring acquires terms usable to validate data for generating the at least one parameter-based requirement.

19. The system of claim 17, further comprising means for restricting the user input based on the terms.

20. The system of claim 19, wherein the means for generating comprises:

means for formatting the at least one parameter-based requirement based on the terms and the user input; and means for validating the at least one parameter-based requirement based on the terms and the user input.

21. The system of claim 20, wherein the artifact further comprises requirements documentation, supporting documentation, a management report, or production code.

22. The system of claim 16, wherein the means for acquiring comprises means for modifying the terms.

23. The system of claim 16, wherein the means for acquiring comprises means for altering the attributes.

24. The system of claim 16, wherein an attribute among the attributes comprises metadata selected from a group consisting of meaning, source, usage, persistence, hyperlinked references, validation rule, and design artifact.

25. A non-transitory computer-readable storage medium storing instructions for execution by a processor to implement a method for developing and generating parameter-based requirements, the method comprising:

acquiring a set of terms usable to generate at least one parameter-based requirement, wherein the terms include attributes;

storing the terms and the attributes in a glossary;

receiving user input based on the terms stored in the glossary;

generating the at least one parameter-based requirement based on the terms stored in the glossary and the user input, wherein the at least one parameter-based requirement is machine-executable;

creating an artifact based on the at least one parameter-based requirement, wherein the artifact comprises a test case;

generating a machine-executable requirements model based on the at least one parameter-based requirement, wherein said machine-executable requirements model is generated by a requirements simulator; and executing said machine-executable requirements model via said requirements simulator in accordance with said test case, wherein said executing said machine-executable requirements model comprises:

generating at least one expected result from said test case;

deriving at least one test execution flow which incorporates term data and contains at least one process flow diagram representing a sequence of execution through said requirements model that contributed to the at least one expected result;

displaying the at least one process flow diagram and at least one hyperlink related to said incorporated term data; and selecting the at least one hyperlink to navigate to a term definition, said term definition being stored in said glossary.

26. The computer-readable storage medium of claim 25, wherein acquiring comprises acquiring terms usable to gather data for generating the at least one parameter-based requirement.

27. The computer-readable storage medium of claim 26, wherein acquiring comprises acquiring terms usable to format data for generating the at least one parameter-based requirement.

28. The computer-readable storage medium of claim 26, wherein the user input is restricted based on the terms.

29. The computer-readable storage medium of claim 28, wherein generating the at least one parameter-based requirement comprises:

formatting the at least one parameter-based requirement based on the terms and the user input; and validating the at least one parameter-based requirement based on the terms and the user input.

30. The computer-readable storage medium of claim 29, wherein the artifact further comprises requirements documentation, supporting documentation, a management report, or production code.

31. The computer-readable storage medium of claim 25, wherein acquiring comprises modifying the terms.

32. The computer-readable storage medium of claim 25, wherein acquiring comprises altering the attributes.

33. The computer-readable storage medium of claim 25, wherein the attributes comprise metadata selected from a group consisting of meaning, source, usage, persistence, hyperlinked references, validation rule, and design artifact.

34. The method according to claim 1, wherein the artifact further comprises production code, and further comprising modifying the production code to reflect an update to the first attribute.

35. The method according to claim 1, wherein a first one of the attributes is a storage location of data, and further comprising modifying the test case to reflect the update to the storage location.

* * * * *